Inventor:
CARLO GILARDI
By: Attorney

United States Patent Office 2,745,504
Patented May 15, 1956

2,745,504

AUXILIARY MOTOR AND DRIVE FOR BICYCLES ADAPTED TO BE CONFINED BETWEEN THE PEDALS THEREOF

Carlo Gilardi, Milan, Italy

Application October 16, 1951, Serial No. 251,613

Claims priority, application Italy October 30, 1950

1 Claim. (Cl. 180—33)

Auxiliary engines for bicycles, which transmit motion to the rear wheel by way of a roller in frictional contact with a wheel tire, offer many advantages if they can be mounted under the frame between the planes in which the pedal cranks turn, as described in Patent No. 2,491,076 to M. Benazoli.

With the embodiment illustrated in said patent, the device comprises a secondary shaft carrying the roller and actuated by the drive shaft by means of a couple of gears or of a chain.

This arrangement has the purpose of limiting the width of the drive assembly within the required limits, because the condition that the middle plane of the roller shall coincide with the wheel plane, that is to say with the middle plane of the pedal cranks, and the overall space required for containing the assembly comprising a crankshaft with its respective supports, the flywheel and the roller, do not allow for the drive assembly being contained between the pedals without arranging the latter at an excessive distance from each other; therefore, it has been held so far to be indispensable to arrange the roller on a second shaft as mentioned above.

It is an object of the present invention to provide an auxiliary drive for bicycles, wherein the transmission is obtained by means of a friction roller, that is carried directly by the drive shaft, said device being nevertheless adapted to be contained between the two pedals of a bicycle without adopting an excessive spacing of said pedals.

In the drive according to the invention, the crackshaft is dispensed with; the engine frame casing carries an overhanging hub, which in its inside supports the drive shaft projecting to the outside with one end onto which there is fitted the drive roller which is hollow and covers said hub, while the other part of said shaft is overhanging inside the engine frame and carries an eccentric cooperating with a connecting rod, and the flywheel.

Preferably, the hub carries in its inside two ball or roller bearings, which constitute the pair of supports of the drive shaft.

Since the middle plane of the roller intersects the drive shaft in correspondence with its support zone, the distance of this plane from the plane wherein the connecting rod moves, can be kept within very narrow limits and the width of the whole device need not be much larger than the sum of the spaces required by the roller, the eccentric, which replaces the crank of the shaft, and the flywheel.

This width is such as to be kept easily between the pedals of a bicycle and this advantage has fundamental importance, because it permits to embody a novel type of engine for the purposes specified, which offers constructional simplicity and, consequently, considerably lower cost of manufacture and maintenance as compared with the constructions known up till now.

There are known auxiliary engines for bicycles with friction roller transmission, wherein the roll surrounds the hub, which supports the drive shaft, for example in the British Patent 731 of year 1896, and in the United States Patent 1,479,084. However, these known engines are not adapted to be accommodated under the hub of the pedal cranks, because the drive shaft is a crank shaft and both the roller and the flywheel are mounted on the drive shaft at the same side in respect to the crank.

With these known arrangements, the width of the whole device turns out to be so large as to make it impossible to accommodate the engine under the hub of the pedal cranks. On the contrary and distinguished from the known art, it has now been found that such accommodation can be made possible if all the three conditions stated hereinbefore are provided, that is to say, the roller covers at least in part the single hub for supporting the shaft, the connection between the connecting rod and the shaft by means of an eccentric in lieu of a crank, and the arrangement of the flywheel at that end of the drive shaft that is opposed to the end carrying the roller, whence said eccentric is between the hub and the flywheel.

The above statement will be more readily understood from the following description of one example of embodiment, with reference to the accompanying drawing, wherein.

Figures 1, 2:
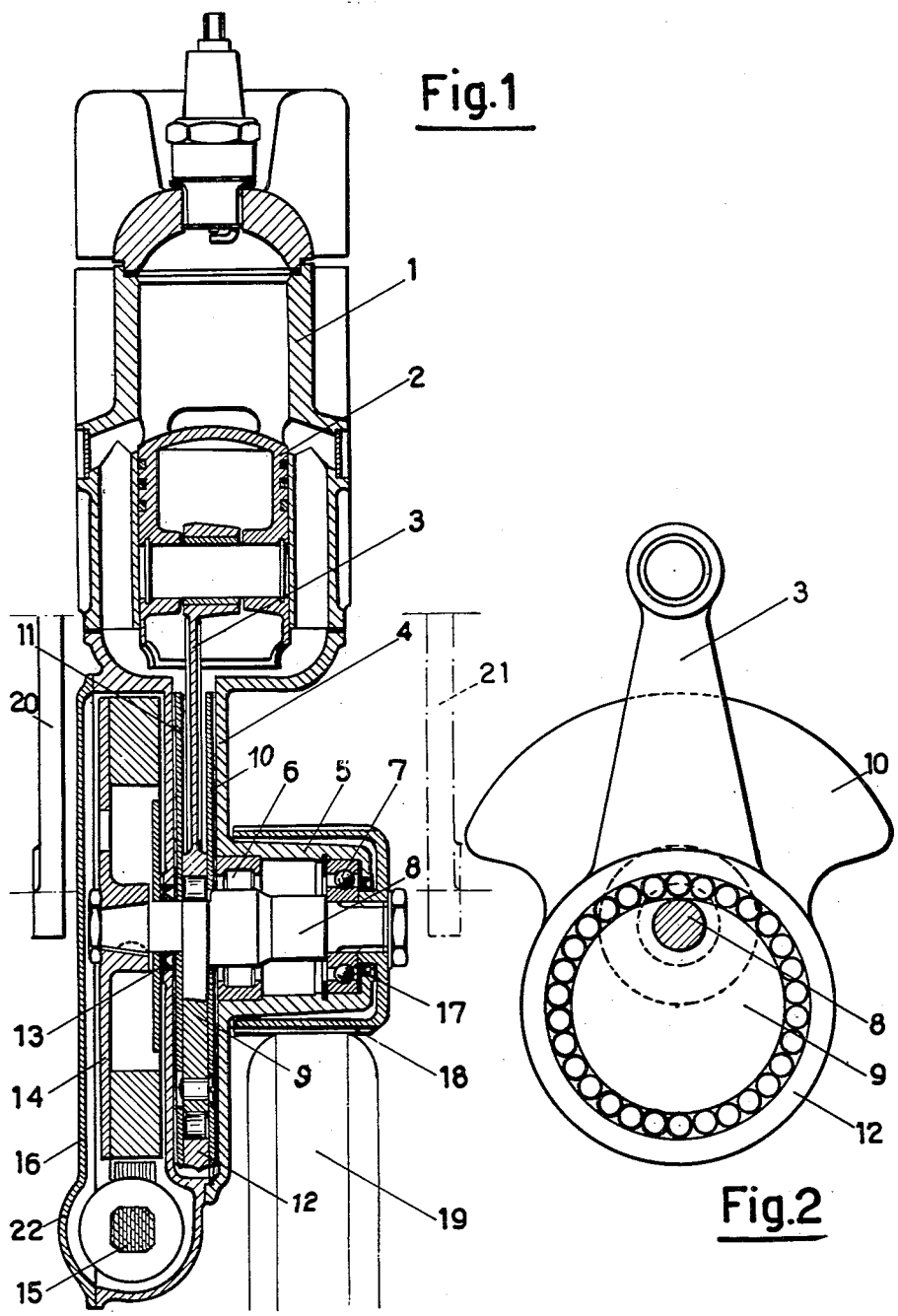
Fig. 1 is a longitudinal section of the device (section ABC of Fig. 3)
Fig. 2 is a partial section of Fig. 1 on a parallel plane close to the eccentric.

The engine of Fig. 1 comprises a cylinder 1 in which a piston 2 acts controlling a connecting rod 3; integral with the cylinder 1 is a casing 4 containing the other mechanisms hereinafter described.

The casing 4 carries a hub 5 overhanging and rigid therewith, in which there are provided the seats of the bearings 6 and 7, which support the shaft 8. On the shaft 8 there is fixed an eccentric 9 of small thickness, for instance 5 mm., laterally to which there are applied two plates 10 and 11 of asymmetric shape in respect to the shaft 8, so as to constitute with the eccentric 9 an assembly balanced with respect to the axis of the shaft 8. On the eccentric 9 and between the plates 10 and 11 there is pivotally mounted on rollers the ring 12, which constitutes the head of the connecting rod 3 and which has a small thickness like the eccentric 9. The end of shaft 8 projects from the casing 4 through the seal packing 13 and carries a flywheel 14, which in the case of the drawing constitutes also, in combination with the stator 15, the generator of electric power for igniting the engine.

In the space left free inside the rim of the flywheel there is place left for the breaker and the condenser. The cover 16 closes the space, in which the flywheel is accommodated. On the other end of the shaft 8, which end projects from the hub 5 through the gasket 17, there is fixed the hollow roller 18, which substantially envelopes the hub 5 without touching it. The roller 18 engages by friction with the tire 19 of the bicycle. As will be seen from the drawing, the middle transversal plane of the roller intersects the shaft 8 between the two bearings 6 and 7, that is to say where the shaft is supported.

In Fig. 1, reference numerals 20 and 21 indicate the pedal cranks between the rotation planes of which the drive or engine will have space to be mounted.

It is obvious that those parts of the engine, which are not comprised in the radius of revolution of the pedal cranks, may have also larger axial projection. For example, in Fig. 1, the cover 16 has a jut 22 in correspondence with the stator 15.

It should be noted that the stator 15 is placed externally in respect to the periphery of the flywheel, in order that the latter may be made as thin as possible and the room enclosing it may be accordingly narrow.

Figure 3:
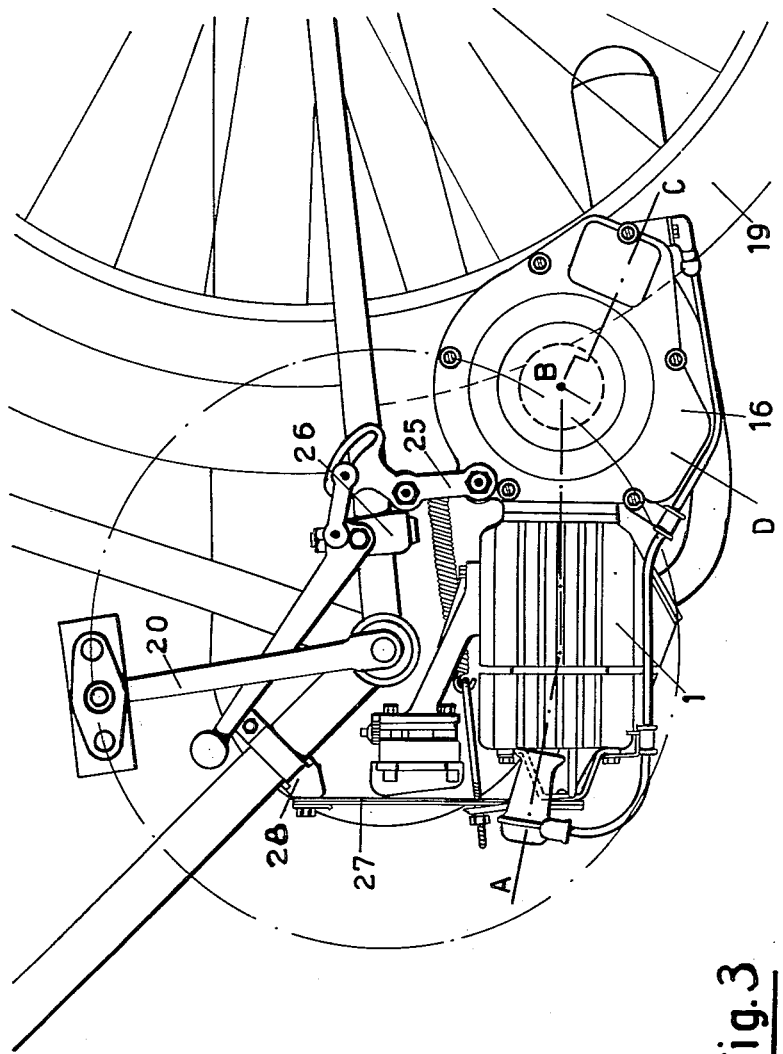
Fig. 3 shows in lateral view the engine applied to a bicycle.

Fig. 3 shows the drive of Figure 1 applied under the frame of a bicycle between pedal cranks, of which pedal crank 20 is visible. Fastening the device to the bicycle is obtained by means of a small connecting rod 25 hinged on the casing of the engine and on a piece 26 fixed to the rear fork, and a flexible lamina 27 rigidly fixed to the cylinder 1 and to a piece 28 fixed in turn to the inclined tube of the frame.

What I claim is:

In a conventional bicycle, a power unit connected with the bicycle frame and disposed substantially below the axis of rotation of the pedal crankshaft and between the planes of rotation of the pedal cranks of the bicycle and comprising a casing including a cylinder having a piston reciprocable therein, a hub projecting from one side of said casing, a drive shaft rotatably mounted at only one end in said hub, a cup-shaped roller secured to said one end of said shaft and enveloping said hub for frictional driving contact with the rear wheel tire of the bicycle, an eccentric on said shaft and within said casing, a connecting rod extending from said piston and terminating in a ring portion about said eccentric, a flywheel at the other unsupported end of said shaft opposite said roller, and plate members at the opposite sides of said eccentric within the casing and retaining said ring portion therebetween, said plate members extending in parallel with said connecting rod to counterbalance said eccentric.

References Cited in the file of this patent

UNITED STATES PATENTS

| | | |
|---|---|---|
| 710,831 | Anderson | Oct. 7, 1902 |
| 1,364,476 | Bates | Jan. 4, 1921 |
| 1,479,084 | Neyret | Jan. 1, 1924 |
| 1,995,438 | Sheats | Mar. 26, 1935 |
| 2,031,881 | Evinrude | Feb. 25, 1936 |
| 2,491,076 | Benazzoli | Dec. 13, 1949 |
| 2,525,248 | Walton | Oct. 10, 1950 |

FOREIGN PATENTS

| | | |
|---|---|---|
| 954,847 | France | June 20, 1949 |
| 476,369 | Great Britain | Dec. 7, 1937 |
| 462,673 | Italy | Mar. 30, 1951 |